Aug. 20, 1957    J. J. A. P. VAN AMSTEL ET AL    2,803,791
BLOCKING LAYER RECTIFIER CELLS
Filed May 21, 1953

INVENTORS
JOHANNES JACOBUS ASUERUS PLOOS
VAN AMSTEL
ADRIANUS VAN WIERINGEN
BY

AGENT 2,803,791

BLOCKING LAYER RECTIFIER CELLS

Johannes Jacobus Asuerus Ploos van Amstel and Adrianus van Wieringen, Eindhoven, Netherlands, assignors, by mesne assignments, to North American Philips Company, Inc., New York, N. Y., a corporation of Delaware Application May 21, 1953, Serial No. 356,394

Claims priority, application Netherlands July 31, 1952

3 Claims. (Cl. 317—234)

The invention relates to blocking layer rectifiers, more particularly to blocking layer rectifier cells comprising a supporting plate which supports a plurality of separate rectifier cells. It is known to apply to one surface of a blocking layer rectifier a continuous selenium layer which supports a number of highly conducting electrodes electrically insulated from one another. They are separated by narrow strips which are not coated with conductive material. In this construction each highly conducting electrode has a separate supply conductor so that as many separate rectifier cells are formed and each cell is adapted to be controlled separately.

The object of the invention is inter alia to provide satisfactory cooling of such cells.

According to the invention the supporting plate supports a number of separate semi-conducting cells which occupy a part of the surface of the plate which, at a maximum, is equal to the uncovered part thereof.

Preferably the covered part of the plate is small as compared with the uncovered part and may be less than one tenth thereof.

This measure enables the part of the rectifier plate which is not covered by the electrodes satisfactorily to conduct away the heat produced in the cells.

It is well known to increase the cooling capacity of a supporting plate by bringing it into heat-conducting contact with a cooling plate. In the case of a plurality of cells as many cooling plates must be used. The construction according to the invention, in which a plurality of semi-conducting electrodes are arranged on a single plate, has the advantage that the electrodes can be manufactured more readily than if they are to be arranged on separate plates. The fitting of such plates is also facilitated.

In a preferred embodiment the semi-conducting electrodes are constituted by bodies which are soldered to the supporting plate. These bodies may be made of germanium or silicon.

The supporting plate may comprise cuts so as to form tags or arm portions at the ends of which the semi-conducting electrodes are arranged.

This readily enables the semi-conducting electrodes to be held resiliently against other, highly conducting electrodes.

Some specific embodiments will now be described by way of example with reference to the accompanying drawing, in which:

Figs. 1, 3 and 5 are perspective views of three embodiments, of which

Figs. 2, 4 and 6 are successive sectional views.

Figures 1, 2:
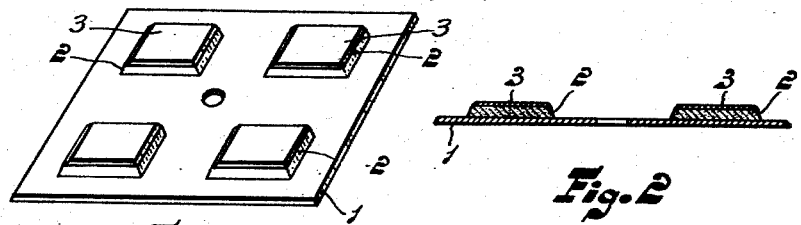

Referring now to the figures, the rectifier shown in Figs. 1 and 2 comprises a supporting plate 1 which for example is made of nickel-plated aluminum and which supports four semi-conducting electrodes 2 shaped in the form of selenium layers and coated with a highly conducting electrode 3, which may be made of an alloy of tin, bismuth and cadmium which melts at 103° C. These highly conducting electrodes must be provided with conductors which may be constituted by resilient contacts or by conductors secured in place by soldering.

Thus there are four cells on a single supporting plate, a large part of which is uncovered and highly capable of conducting heat away.

Figure 3:
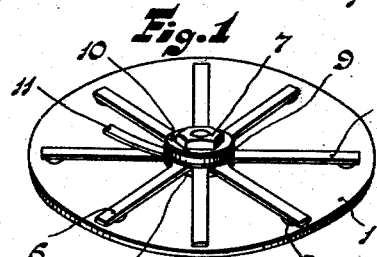
Figure 4:
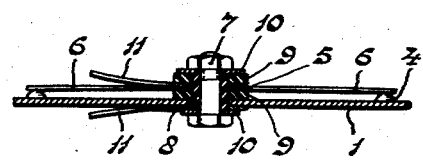

The rectifier shown in Figures 3 and 4 comprises a supporting plate 1 to which eight semi-conducting bodies 4 are secured by soldering. These bodies may be made of germanium or silicon. The highly conductive electrodes are constituted by a ring 5 provided with eight resilient tags 6. The ring is centrally secured to the supporting plate in an electrically insulated manner by means of a bolt 7, an insulating sleeve 8, two insulating rings 9 and a conductive ring 10. Two soldering tags 11 permit of connecting conductors to the rectifier.

Figure 5:
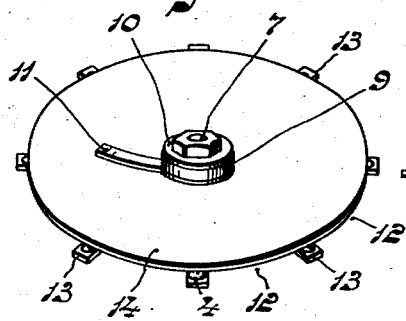
Figure 6:
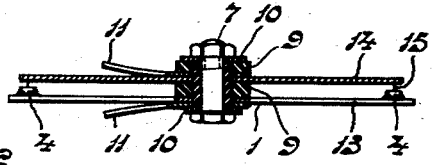

The rectifier shown in Figs. 5 and 6 comprises a supporting plate 1 which has cuts 12 formed in it resulting in the formation of eight tags or outwardly-flaring surface portions 13. Semi-conducting bodies 4 are soldered to these tags or arms adjacent the ends. Slightly spaced away from the supporting plate is arranged a metal support 14, which has secured to it eight pointed electrodes 15 which bear on the semi-conducting electrodes. The support 14 and the supporting plate 1 are interconnected by a bolt 7 in a similar manner to the rectifier shown in Figs. 3 and 4.

In the constructions shown in Figs. 3 to 6 the highly conducting electrodes are held against the semi-conducting electrodes. The invention can also be applied to rectifier cells of the kind in which the highly conducting electrode is intimately connected to the semi-conducting body and has a resilient connecting wire secured to it, for example, by soldering.

Figure 7:
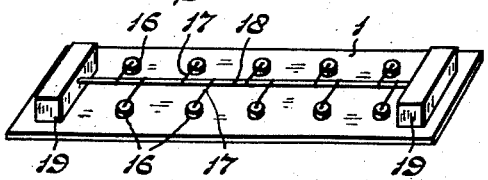
Figs. 7 and 8 are perspective views of two alternative embodiments.

An efficient arrangement of such cells is shown in Fig. 7. The supporting plate 1 has a number of semi-conducting bodies 16 secured to it by soldering. The highly conducting electrodes (not shown separately) have secured to them by soldering connecting wires 17 which are connected to a common conductor 18 which is secured to the supporting plate by means of insulating supports 19.

Figure 8:
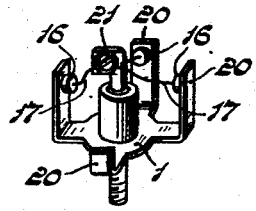

An alternative arrangement of such cells is shown in Fig. 8. In this figure a supporting plate 1 comprises bent-up tags or flanged portions 20. For the sake of clarity the foremost of these tags is partially broken away. Semi-conducting bodies 16 are secured by soldering to the adjacent surfaces of these tags. Connecting wires 17 lead to a central terminal 21 which is centrally secured to the supporting plate from which they are electrically insulated.

What is claimed is:

1. A blocking rectifier assembly comprising an electrically conductive supporting plate having outwardly flaring surface portions and a plurality of separate spaced rectifier cells each comprising a semi-conductive body constituting an electrode of each of said cells, solder means connecting each of said semi-conductive bodies with an outwardly flaring portion of the supporting plate, and a counter-electrode on a surface of each of the semi-conductive bodies opposite the supporting plate, the total area occupied by all of said semi-conductive bodies being less than one-half the total surface area of the supporting plate on the side supporting the cells.

2. A blocking rectifier assembly comprising an electrically conductive supporting plate having a plurality of flanged portions and a plurality of separate spaced rectifier cells each comprising a semi-conductive body constituting an electrode of each of the cells, solder means connecting one surface of each of the bodies to adjacent flanged portions of the supporting plate, and a counter-electrode on a surface of each of the bodies opposite the supporting plate, the total area occupied by all of said semi-conductive bodies being less than one-half the total surface area of the supporting plate on the side supporting the cells.

3. A blocking rectifier assembly as set forth in claim 1 wherein the supporting plate comprises spaced arm members secured to a common center portion.

References Cited in the file of this patent

UNITED STATES PATENTS

| | | |
|---|---|---|
| 2,215,667 | Sherman | Sept. 24, 1940 |
| 2,327,511 | Lange et al. | Aug. 24, 1943 |
| 2,353,461 | Hamann | July 11, 1944 |
| 2,505,633 | Whaley | Apr. 25, 1950 |
| 2,665,399 | Lingel | Jan. 5, 1954 |